United States Patent [19]
Greiff

[11] Patent Number: 5,817,942
[45] Date of Patent: Oct. 6, 1998

[54] CAPACITIVE IN-PLANE ACCELEROMETER

[75] Inventor: Paul Greiff, Wayland, Mass.

[73] Assignee: The Charles Stark Draper Laboratory, Inc., Cambridge, Mass.

[21] Appl. No.: 608,144

[22] Filed: Feb. 28, 1996

[51] Int. Cl.$^6$ ........................................... G01P 15/00
[52] U.S. Cl. .................... 73/514.01; 73/514.17; 73/514.35; 361/280
[58] Field of Search ................ 73/514.32, 514.18, 73/514.21, 514.36, 514.23, 510, 511, 514.01, 526, 539, 546, 548, 504.03, 504.4, 504.12, 504.15, 504.16, 862.382, 514.14, 514.17, 514.35; 361/280, 283.3

[56] References Cited

U.S. PATENT DOCUMENTS

| Re. 32,931 | 5/1989 | Staudte | 73/505 |
|---|---|---|---|
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |

(List continued on next page.)

FOREIGN PATENT DOCUMENTS

| 55-121728 | 9/1980 | Japan . | |
|---|---|---|---|
| 58-136125 | 8/1983 | Japan . | |
| 59-37722 | 3/1984 | Japan . | |
| 59-158566 | 9/1984 | Japan . | |
| 61-144576 | 7/1986 | Japan . | |
| 62-71256 | 8/1987 | Japan | H01L 27/06 |
| 62-221164 | 9/1987 | Japan | H01L 29/84 |
| 63-169078 | 7/1988 | Japan | H01L 29/84 |
| 2183040 | 5/1987 | United Kingdom | G01F 15/02 |
| 9201941 | 2/1992 | WIPO | G01P 9/04 |
| 9305401 | 3/1993 | WIPO | G01P 9/04 |

OTHER PUBLICATIONS

Barth, P.W. et al., "A Monolithic Silicon Accelerometer With Integral Air Damping and Overrange Protection", 1988 IEEE, pp. 35–38.

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Micromechanical Inertial Guidance System and its Application", Fourteenth Biennial Guidance Test Symposium, vol. 1, Oct. 3–5, 1989, pp. 113–131.

Boxenhorn, B., et al., "Monolithic Silicon Accelerometer", *Transducers '89*, Jun. 25–30, 1989, pp. 273–277.

Boxenhorn, B., et al., "A Vibratory Micromechanical Gyroscope", AIAA Guidance, Navigation and Control Conference, Minneapolis, Aug. 15–17, 1988, pp. 1033–1040.

Howe, R., et al., "Silicon Micromechanics: Sensors and Acturators on a Chip", IEEE Spectrum, Jul. 1990, pp. 29–35.

Moskalik, L., "Tensometric Accelerometers with Overload Protection", Meas. Tech. (USA), vol. 22, No. 12, Dec. 1979 (publ. May 1980), pp. 1469–1471.

(List continued on next page.)

*Primary Examiner*—Hezron E. Williams
*Assistant Examiner*—Richard A. Moller
*Attorney, Agent, or Firm*—Weingarten, Schurgin, Gagnebin & Hayes LLP

[57] ABSTRACT

An accelerometer having one or more flexure stops for increasing the stiffness of the flexures when the accelerometer is subjected to relatively high acceleration. A wraparound proof mass is suspended over a substrate by anchor posts and a plurality of flexures. In one embodiment, the proof mass has a rectangular frame including top and bottom beams extending between left and right beams and a central crossbeam extending between the left and right beams. Proof mass sense electrodes are cantilevered from the top, bottom and central beams and are interleaved with excitation electrodes extending from adjacent excitation electrode supports. Each of the flexure stops includes a pair of members extending along a portion of a respective flexure. Also described is a three axis accelerometer triad device and a dissolved wafer process for fabricating the devices described herein.

14 Claims, 5 Drawing Sheets

U.S. PATENT DOCUMENTS

| | | | |
|---|---|---|---|
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 5/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Masuda et al. | 356/350 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,674,331 | 6/1987 | Watson | 73/505 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobson et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 73/862.59 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,016,072 | 5/1991 | Greiff | 357/26 |
| 5,025,346 | 6/1991 | Tang | 361/283 |
| 5,038,613 | 8/1991 | Tanenaka et al. | 73/510 |
| 5,060,039 | 10/1991 | Weinberg et al. | 357/26 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,195,371 | 3/1993 | Greiff | 73/505 |
| 5,203,208 | 4/1993 | Bernstein | 73/505 |
| 5,205,171 | 4/1993 | O'Brien et al. | 73/504 |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,335,544 | 8/1994 | Wagner et al. | 73/862.382 |
| 5,349,855 | 9/1994 | Bernstein et al. | 73/505 |
| 5,511,420 | 4/1996 | Zhao et al. | 73/514.18 |
| 5,542,295 | 8/1996 | Howe et al. | 73/514.18 |
| 5,574,222 | 11/1996 | Offenberg | 73/514.32 |
| 5,576,250 | 11/1996 | Diem et al. | 437/228 |
| 5,578,755 | 11/1996 | Offenberg | 73/514.32 |
| 5,600,065 | 2/1997 | Kar et al. | 73/504.12 |
| 5,610,335 | 3/1997 | Shaw et al. | 73/514.36 |
| 5,618,989 | 4/1997 | Marek | 73/1.38 |
| 5,627,318 | 5/1997 | Fujii et al. | 73/514.32 |
| 5,635,638 | 6/1997 | Geen | 73/504.04 |

OTHER PUBLICATIONS

Nakamura, M., et al., "Novel Electrochemical Micro–Machining and Its Application for Semiconductor Acceleration Sensor IC", *Digest of Technical Papers* (1987), Institute of Electrical Engineers of Japan, pp. 112–115.

Petersen, K.E., et al., "Micromechanical Accelerometer Integrated with MOS Detection Circuitry", IEEE, vol. ED–29 No. 1 (Jan. 1982), pp. 23–27.

Petersen, Kurt E., et al., "Silicon as a Mechanical Material", *Proceedings of the IEEE,* vol. 70, No. 5, May 1982 pp. 420–457.

"Quartz Rate Sensor Replaces Gyros", *Defense Electronics,* Nov. 1984, p. 177.

Rosen, Jerome, "Machining In the Micro Domain", *Mechanical Engineering,* Mar. 1989, pp. 40–46.

Teknekron Sensor Development Corporation, article entitled "Micro–Vibratory Rate Sensor", 1080 Marsh Road, Menlo Park, CA 94025, 2 pages, undated.

Bryzek, Janusz et al., "Micromachines on the March", IEEE Spectrum, May 1994, pp. 20–31.

IEEE Robotics & Automation Soc, in coop. w/ASME Dynamic Systems & Control Div., "Micro Electro Mechanical Systems, An Investigation of Mirco Structures, Sensors, Actuators, Machines and Systems", IEEE Cat. #93CH3265–6, Library of Congress #92–56273, Ft. Lauderdale, Fl. Feb., 7–1O, 1993.

CAPACITIVE IN-PLANE ACCELEROMETER

FIELD OF THE INVENTION

This invention relates generally to accelerometers and more particularly, to a capacitive in-plane accelerometer and a technique for fabricating the same.

BACKGROUND OF THE INVENTION

Micromechanical sensors which are responsive to inertial excitation, such as rate, are known. One such sensor is described in U.S. Pat. No. 5,349,855 to include a silicon substrate over which a rotatable assembly is suspended. The rotatable assembly includes first and second vibrating elements which extend between electrode supports. Flexures extend from the remote edges of the electrode supports to respective support pillars which, in turn, are coupled to the substrate through surface electrodes. The sensor has a comb drive arrangement including driven electrodes in the form of cantilevered fingers extending from respective vibrating elements. Drive electrodes extend from the support elements and are interleaved with the driven electrodes.

SUMMARY OF THE INVENTION

In accordance with the invention, a simple and relatively inexpensive accelerometer is provided which is particularly advantageous for use in a three axis accelerometer device (i.e., a triad) formed on a single substrate. The accelerometer includes a planar substrate. The input axis of the device is disposed coplanar to the plane of the substrate. A plurality of posts extend substantially vertically from the substrate, each of which terminates at a corresponding support element. Flexures are provided having a first end coupled to a corresponding support element and a second end coupled to a proof mass which is thus suspended over the substrate. At least one stop mechanism extends from at least one of the support elements along a portion of a respective flexure. The stop mechanism serves to effectively stiffen the flexures when the proof mass is subjected to relatively high acceleration.

With this arrangement, the flexures can be provided with a relatively high aspect ratio and narrow beam width, as is desirable in order to increase the sensitivity of the device, without increasing the likelihood that the proof mass sense electrodes will contact the adjacent excitation electrodes. Conventionally, the flexures have been designed to be relatively stiff in order to ensure that the proof mass does not contact the excitation electrodes when the device is subjected to large inertial excitation. Since the stop mechanism reduces the tendency of the proof mass to contact the excitation electrodes, the flexures can be made weaker and thus, the accelerometer is more sensitive, than otherwise possible.

Each stop mechanism includes a pair of elongated members, positioned along opposite sides of the corresponding flexure. In one embodiment, each of the members has a rounded end, in order to avoid disadvantageously damaging the flexure upon contact.

The accelerometer includes a "wrap-around" proof mass having a continuous frame. In one embodiment, the proof mass has a rectangular frame, including top and bottom beams extending between left and right beams and a central crossbeam extending between the left and right beams. The accelerometer has a comb arrangement, including a plurality of excitation electrode supports from which a plurality of excitation electrodes are cantilevered. A plurality of proof mass sense electrode fingers are cantilevered from the top, bottom and central beams of the proof mass and are interleaved with the excitation electrodes. Use of such a comb drive arrangement is advantageous due to the increased capacitance between the proof mass electrode fingers and the excitation electrodes, which enhances the sensitivity with which inertial excitations are detected.

Also described is a triad device including three accelerometers supported by a single substrate. Two of the accelerometers are of the in-plane type described above, having input axes co-planar to the plane of the substrate and orthogonal with respect to each other. The third accelerometer of the triad is also oriented in the plane of the substrate. However, the third accelerometer has a proof mass which is adapted for deflecting out-of-plane in response to an inertial input and thus, has an input axis which is oriented mutually orthogonal with respect to the input axes of the two in-plane accelerometers.

Also described is a dissolved wafer process for fabricating the capacitive in-plane accelerometer and the triad of the present invention, in accordance with which a silicon substrate is processed to provide the proof mass and a glass substrate is processed to provide the device supporting substrate. In one embodiment, the silicon substrate has a boron doped layer disposed thereover which is processed to provide the proof mass. In an alternative embodiment, an epitaxial layer is disposed over the silicon substrate for processing to provide the proof mass.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
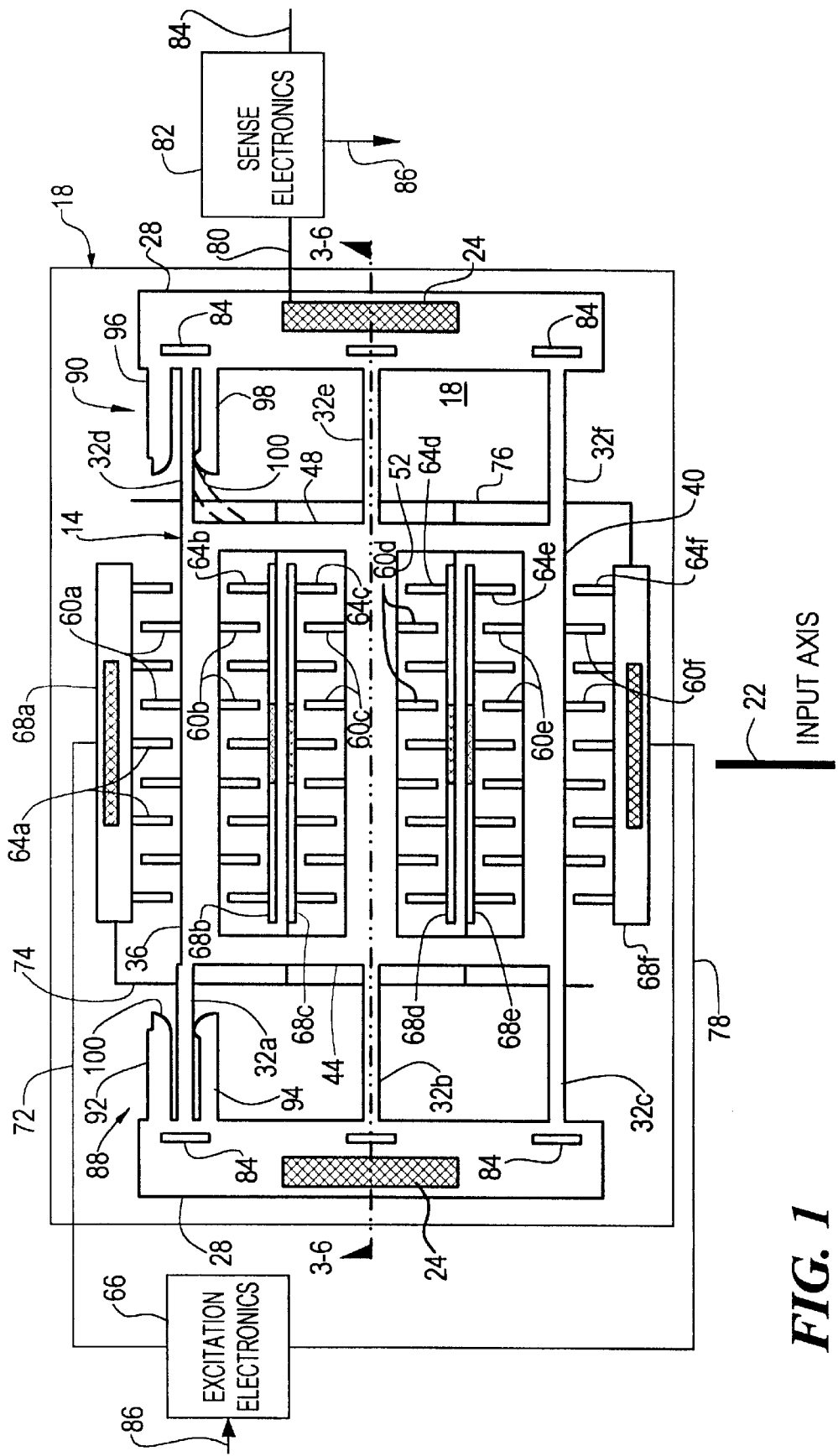
FIG. 1 is a micromechanical accelerometer in accordance with the invention.

Referring to FIG. 1, a micromechanical accelerometer 10 is shown to include a proof mass 14 suspended over a substrate 18 and oriented in a plane which is coplanar with respect to the substrate. The proof mass 14 is responsive to an acceleration about an input axis 22 which lies in the plane of the proof mass for being displaced along the axis 22. The accelerometer 10 may be referred to as an "in-plane" accelerometer since the input axis 22 is in the plane of the device.

A pair of anchor posts 24 extends substantially vertically from the substrate 18. The anchor posts 24 terminate at support elements 28 from which a plurality of flexible linkages, or flexures 32a, 32b, 32c, 32d, 32e and 32f extend laterally. The end of each of the flexures 32 distal from the support elements 28 is coupled to the proof mass 14, as shown. With this arrangement, the proof mass 14 is suspended over the substrate 18 by the anchor posts 24 and flexures 32a–32f.

In the embodiment of FIG. 1, the proof mass 14 is a "wrap around" type, in the sense that the proof mass is in the form of a continuous frame. More particularly, the proof mass 14 is rectangular-shaped and has a top beam 36, a bottom beam 40 and side beams 44 and 48. A central crossbeam 52 extends between the left and right side beams, as shown. Use of a "wrap around" proof mass 14 is advantageous since it provides a larger proof mass volume for a given design footprint, thereby resulting in increased proof mass pendulosity and greater sensitivity. This type of proof mass/flexure arrangement also provides excellent control of proof mass motion, allowing the proof mass to move only along the desired input axis. The number of beams shown in FIG. 1 is illustrative only and it is advantageous to use as many beams as can be accommodated by the area chosen.

A plurality of proof mass sense electrodes extend from the proof mass 14 in the form of cantilevered fingers. More particularly, the sense electrodes extend from the top beam 36, bottom beam 40 and crossbeam 52. Sense electrodes 60a extend from a first side of top beam 40 and sense electrodes 60b extend from a second, opposite side of top beam 40. Sense electrodes 60c extend from a first side of crossbeam 52 and sense electrodes 60d extend from a second, opposite side of crossbeam 52. Finally, sense electrodes 60e extend from a first side of bottom beam 40 and sense electrodes 60f extend from a second, opposite side of bottom beam 40.

A plurality of excitation electrodes 64a, 64b, 64c, 64d, 64e and 64f, also in the form of cantilevered fingers, extend from a plurality of respective excitation electrode supports 68a, 68b, 68c, 68d, 68e and 68f, as shown. The excitation electrode supports are suspended over the substrate 18 by respective anchor posts. The excitation electrodes 64a–f are interleaved with the proof mass sense electrodes 60a, 60b, 60c, 60d, 60e and 60f, respectively, to provide a comb drive arrangement for permitting acceleration to be read out as a summation signal incident on the proof mass 14.

More particularly, excitation electrodes 64a, 64c and 64e are coupled to a common signal line 74 and are driven by an AC voltage source within signal excitation electronics 66 via a signal line 72 and electrode supports 68a, 68c and 68e. Electrodes 64b, 64d and 64f are coupled to a common signal line 76 and are driven by an AC voltage source that is 180° out of phase with respect to the signal applied to electrodes 64a, 64c and 64e. The signal applied to electrodes 64b, 64d and 64f is provided by a voltage source within electronics 66 via a signal line 78 and electrode supports 68b, 68d and 68f. Illustrative signals applied to the excitation electrodes 64a–f are 100 KHz carrier signals.

The current impressed on the proof mass sense electrodes 60a–f by the electrostatically coupled excitation electrodes 64a, 64c and 64e sums with the current impressed upon the proof mass electrodes by the electrostatically coupled excitation electrodes 64b, 64d and 64f. When the proof mass 14 is centered between electrode supports 68a and 68f, the capacitance between the proof mass sense electrodes 60a–f and the excitation electrodes 64a–f is equal, causing the net signal on the proof mass 14 to be zero. Whereas, a displacement of the proof mass 14 along input axis 22 varies the capacitance between the sense electrodes 60a–f and the excitation electrodes 64a–f, thereby resulting in a net signal being developed on the proof mass 14.

The acceleration which causes the proof mass to be displaced is determined by "reading out" the net signal, or charge, on the proof mass 14. This is achieved by a read out signal line 80 which electrically connects the suspended proof mass 14 to the substrate 18 via conductive anchor post 24. More particularly, the read out signal line 80 provides an input signal to sense electronics 82, which includes an amplifier and demodulator and which provides a sensor output signal 84 indicative of the measured acceleration.

In some applications, the sense electronics 82 may additionally provide a feedback signal 86 for rebalancing the proof mass 14. In such applications, the excitation electrodes 64a–f additionally serve to provide rebalance electrodes which are operative to restore the proof mass 14 to its initial, or null position. That is, in response to measurement of an output signal from the proof mass, a rebalance feedback signal 86 is provided by the sense electronics 82 to the excitation electronics 66. The electronics 66 derives a rebalance signal in response to the rebalance feedback signal 86. The rebalance signal is applied to the excitation electrodes 64a–f to move the proof mass 14 from a displaced position to its original position, centered between excitation electrode supports 68a and 68f. With this arrangement, a force is imparted to the proof mass 14 which counteracts the acceleration. As is known in the art, the accelerometer 10 may alternatively be operated "open-loop" (i.e., without any restorative signal applied by excitation electrodes 64a–f).

In operation, when the accelerometer 10 is subjected to acceleration along the input axis 22, the proof mass 14 is displaced along the input axis, as described above. When the proof mass 14 is thus displaced, flexures 32a–f flex, or bend, as shown by the dotted lines extending from illustrative flexure 32d. It is desirable to facilitate this flexing (i.e., to provide relatively weak flexures in bending) in order to increase the sensitivity of the accelerometer. In the present embodiment, the flexures 32a–f are made relatively weak in bending by providing such flexures 32a–f with a relatively high aspect ratio (i.e., ratio of height to width), such as on the order of three to ten, and also by making the flexures relatively narrow in width. The fabrication techniques described below in conjunction with FIGS. 3–6C permit the flexures 32a–f to be provided with such features. However, the weakness of the flexures that is desirable for sensitivity reasons can cause the proof mass and, more particularly the proof mass sense electrodes 60a–f to contact the excitation electrodes 64a–f when the accelerometer 10 is subjected to relatively high accelerations, thereby disadvantageously causing sticking or fracture of the electrodes. When the micromechanical surfaces touch, there is a greater tendency to stick if current flows between them. Since there is a substantial potential difference between the proof mass electrodes and the excitation electrodes, contact between these elements is likely to result in current flow between them and sticking. On the other hand, the stop mechanisms 88 and 90 and the respective flexures 32 and 32d are electrically shorted together, so that no current flow occurs on contact and sticking is minimized.

More particularly, in accordance with the present invention, stop mechanisms 88 and 90 extend laterally from support elements 28 in order to overcome this potential problem. Each of the stop mechanisms 88 and 90 includes a respective pair of members 92, 94 and 96, 98, as shown. Members 92 and 94 extend along a portion of opposite sides of respective flexure 32a and members 96 and 98 extend along a portion of opposite sides of respective flexure 32d, as shown.

In operation, when the flexures 32a–f flex, the stop mechanisms 88 and 90 limit the in-plane displacement of the proof mass 14, so as to effectively stiffen the flexures. With this arrangement, the proof mass 14 is prevented from contacting the excitation electrodes 64a–f. In the illustrative embodiment, the length of the flexures is approximately one-hundred microns for a one millimeter square proof mass and the stop members are about the same length. However, it will be appreciated that the length and other dimensions of the flexures and/or stop members may be readily varied in order to tailor the effective stiffness of the flexures under lower and higher acceleration conditions as desired. It will also be appreciated that in certain applications, it may be desirable to provide stop mechanisms adjacent to one or more of the remaining flexures 32b, 32c, 32e and 32f.

In the illustrative embodiment, each of the stop members 92–98 has a rounded end portion 100 in order to prevent disadvantageously damaging the respective flexure upon contact. In fact, when the flexures contact the stop members under relatively high acceleration conditions, the stop members themselves may be designed to bend somewhat depending on maximum acceleration load.

The accelerometer 10 shown in FIG. 1 may include various additional features, such as strain relief beams 84. Strain relief beams 84 are provided in the form of slots through the proof mass 14 at the junction of the flexures 32a–f and the respective support element 28 in an orientation orthogonal to the flexures. Strain relief beams 84 serve to reduce buckling and stress from anodic bonding and other process effects. Other strain relief arrangements may also be used, such as the stretch box arrangement described in a co-pending U.S. Pat. application entitled "Gimballed Vibrating Wheel Gyroscope Having Strain Relief Features" filed May 12, 1995, Ser. No. 08/440,536, assigned to the assignee of the present invention, and incorporated herein by reference.

Figure 2:
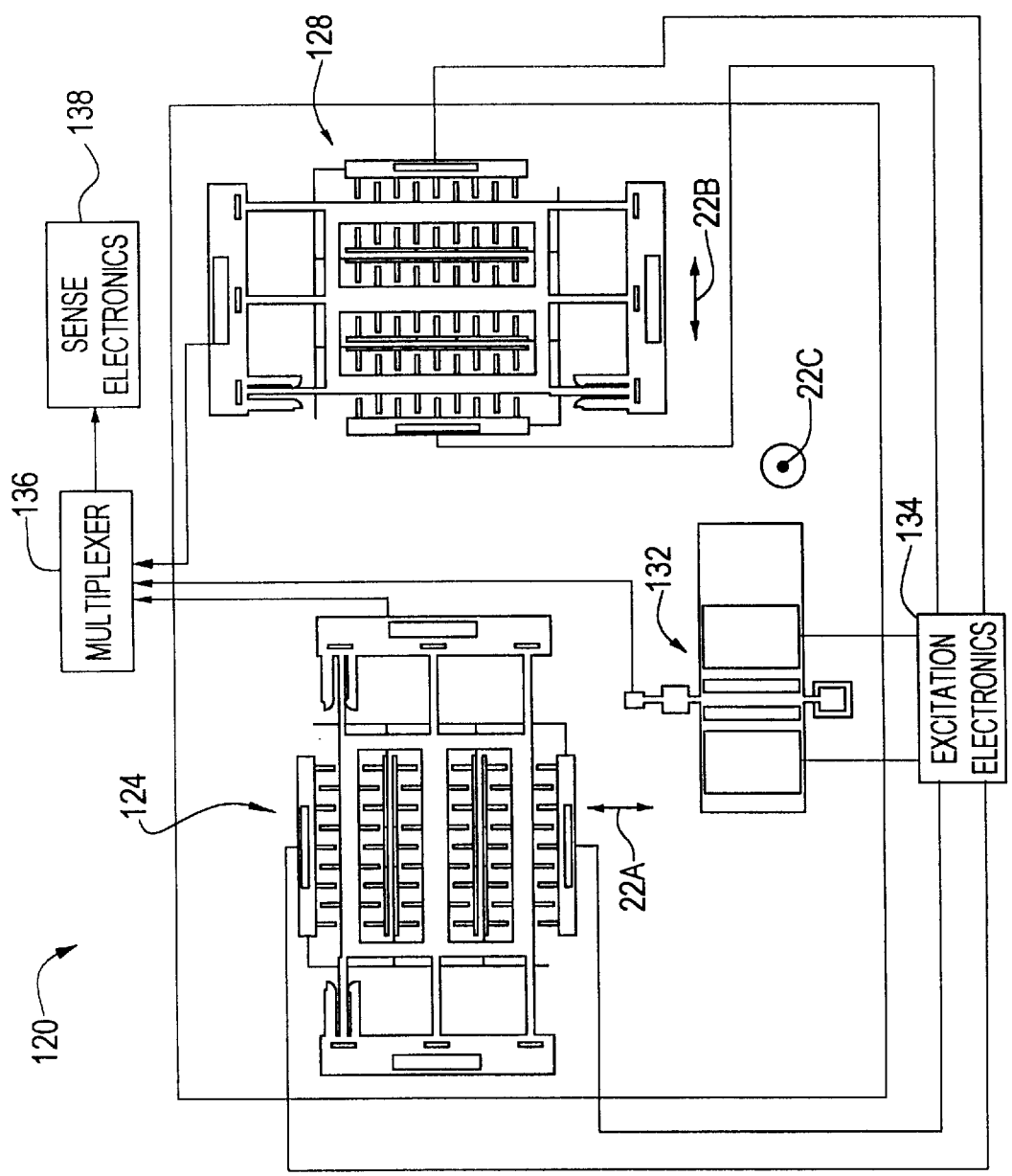
FIG. 2 is a triad in accordance with a further embodiment of the invention.

Referring to FIG. 2, an embodiment of a three axis triad 120 for measuring acceleration along any of three orthogonal axes 22A, 22B and 22C, is shown. The triad 120 includes two accelerometers 124, 128 of the type shown in FIG. 1 and described above. Each of the two "in-plane" accelerometers 124, 128 is oriented at 90° with respect to each other, so that the input axis 22A of accelerometer 124 is offset by 90° from the input axis 22B of accelerometer 128. A see-saw accelerometer 132 is provided for measuring acceleration along an input axis 22C, which is orthogonal to the page and thus, mutually orthogonal with respect to the input axis 22A of accelerometer 124 and the input axis 22B of accelerometer 128. Details of see-saw accelerometer 132 are described in a co-pending U.S. Pat. application entitled "Micromechanical Sensor with a Guard Band Electrode and Fabrication Technique Therefor", filed on Sep. 5, 1995, Ser. No. 08/523,401, assigned to the assignee of the present invention and incorporated herein by reference.

Use of the triad 120 of FIG. 2 is advantageous since the fabrication of the in-plane accelerometers 124, 128 is compatible with fabrication of the see-saw out-of-plane accelerometer 132. More particularly, the fabrication techniques described below are well-suited for fabrication of the accelerometers 124, 128 and 132 of triad 120. Furthermore, electronics may be simplified since common excitation signals may be employed as provided by common excitation electronics 134 and, if multiplexed by a multiplexer 136, a common output sense electronics circuit 138 can be used, thereby reducing the cost.

Figure 3:
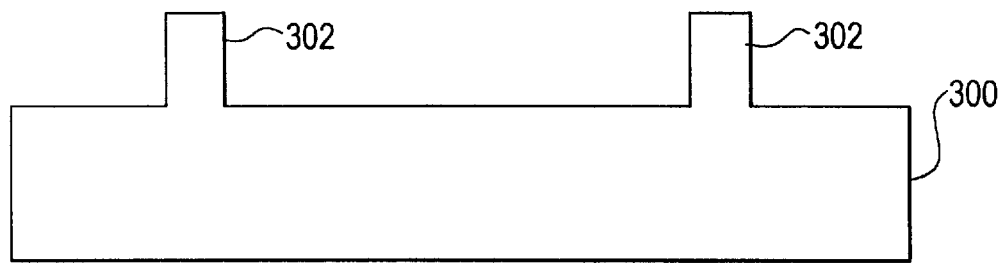
FIGS. 3, 3A and 3B are cross-sectional views of the accelerometer proof mass during fabrication taken along line 3–6 to 3–6 of FIG. 1.
Figure 3A:
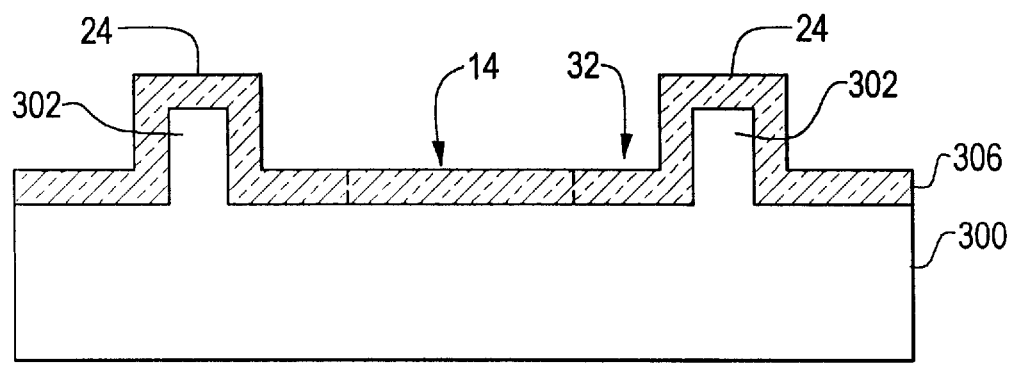
Figure 3B:
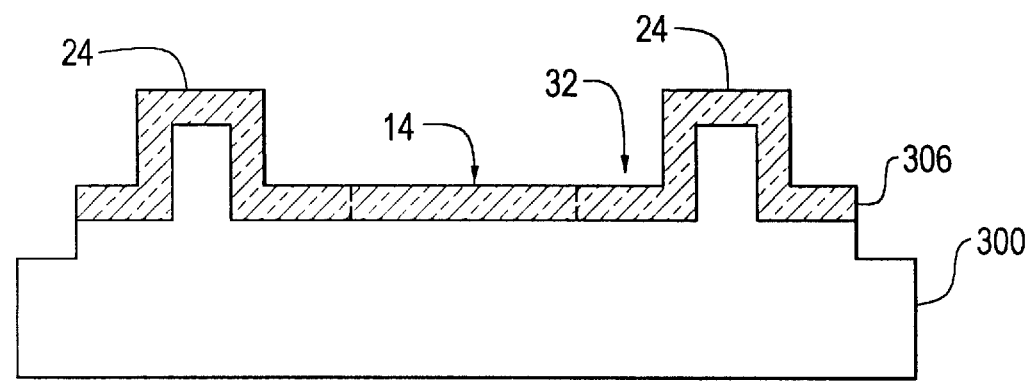

FIGS. 3, 3A and 3B show various stages of the processing of a silicon substrate 300 to provide the proof mass 14 from a cross-sectional view taken along line 3–6 to 3–6 of FIG. 1. Referring to FIG. 3, an undoped silicon substrate 300 having a thickness on the order of 500 microns is etched with a conventional photolithographic process to provide mesas 302.

In FIG. 3A, the top surface of the substrate 300 is doped with boron to a thickness of approximately five microns. The boron doping may be performed using a conventional diffusion process. The resulting boron doped layer 306 defines the proof mass 14, flexures 32, and those portions of the layer 306 which provide anchor posts 24. Thus, the thickness of the boron layer 306 may be varied in accordance with the design particulars of the accelerometer.

In certain applications it may be desirable to additionally dope (i.e., counter dope) the boron doped layer 306 with germanium. Since germanium atoms are larger that silicon atoms by approximately the same amount that boron atoms are smaller than silicon atoms, the germanium tends to compensate for any stresses within the silicon structure attributable to the mismatch of boron with the silicon lattice. In FIG. 3B, a reactive ion etching (RIE) step is performed which defines the dimensions of the proof mass 14.

Figure 4:
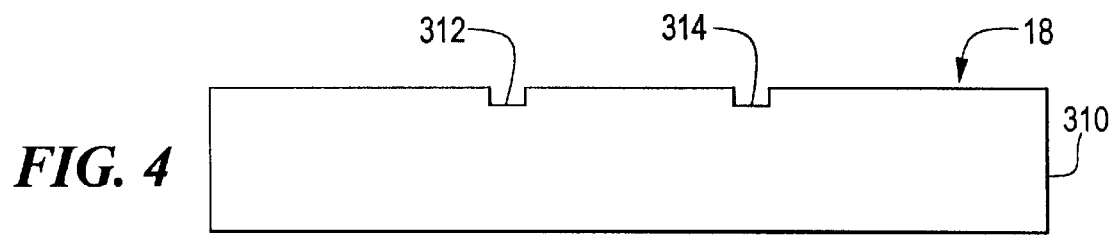
FIGS. 4 and 4A are cross-sectional views of the accelerometer substrate during fabrication taken along line 3–6 to 3–6 of FIG. 1.
Figure 4A:
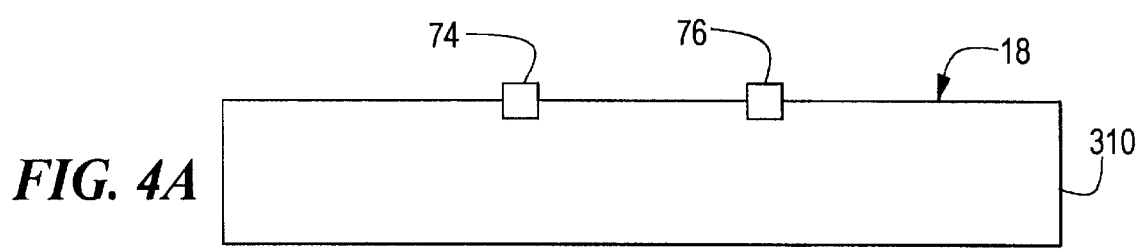

Referring to FIGS. 4 and 4A, a glass substrate 310 is shown during fabrication of the substrate 18 of the accelerometer 10 of FIG. 1. The glass substrate 310 has a thickness on the order of 750 microns. A layer of resist (not shown) is positioned over the glass substrate 310 and patterned in accordance with desired locations of surface traces over the top surface of the substrate 18. Thereafter, the glass substrate 310 is etched to provide recesses 312 and 314, as shown.

The recesses 312 and 314 are used to form conductive traces 74, 76, respectively (FIG. 1). To this end, a layer of metal is deposited in the recesses 312 and 314 to form traces 74 and 76, as shown in FIG. 4A. The traces may be comprised of any suitable conductive material, such as a multilayered deposition of titanium, tungsten, palladium and gold and may be deposited by any suitable technique, such as sputtering, to a thickness of about 2000Å. Thereafter, the resist (not shown) is lifted off to provide the structure of FIG. 4A. The conductive traces 74 and 76 protrude above the top surface of substrate 18 by about 500Å.

Figure 5:
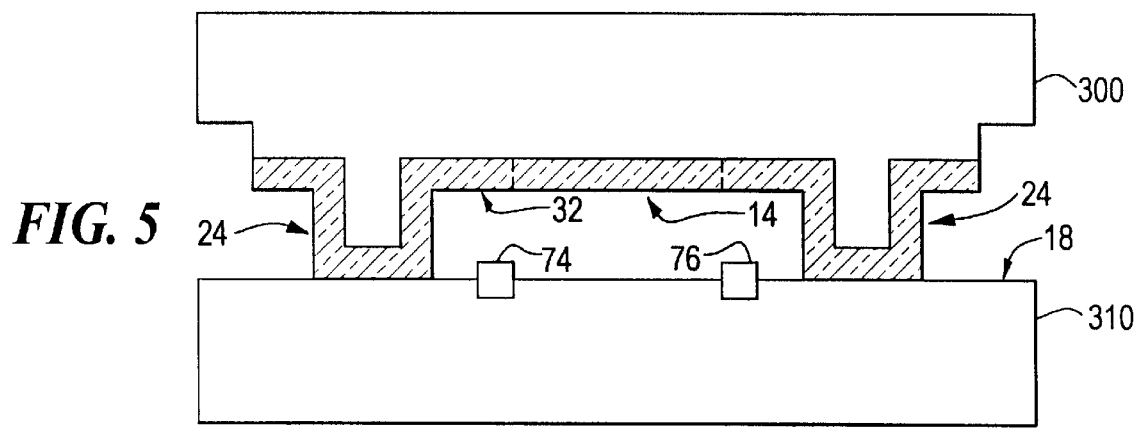
FIGS. 5 and 5A are cross-sectional views of the assembled accelerometer taken along line 3–6 to 3–6 of FIG. 1.

Referring also to FIG. 5, the silicon structure of FIG. 3B is inverted and bonded to the glass substrate structure of FIG. 4A. More particularly, the portions of the boron doped layer 306 providing the anchor posts 24 are anodically bonded to the top surface of the glass substrate 310, as shown. With this arrangement, the accelerometer of FIG. 1 is provided with the proof mass 14 and flexures 32 suspended over the substrate 18.

Figure 5A:
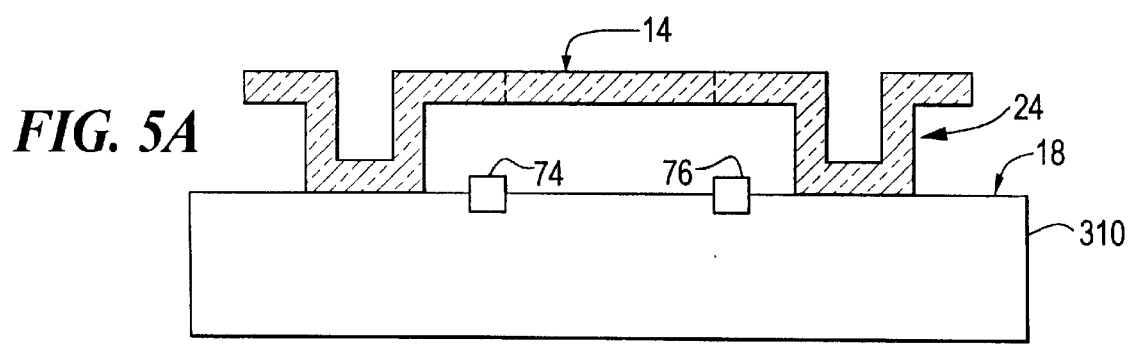

Referring also to FIG. 5A, the silicon substrate 300 is thereafter etched, such as with an EDP etchant, to remove the undoped portion of the substrate. The remaining boron doped proof mass 14 is thus suspended over the substrate 12.

Figure 6:
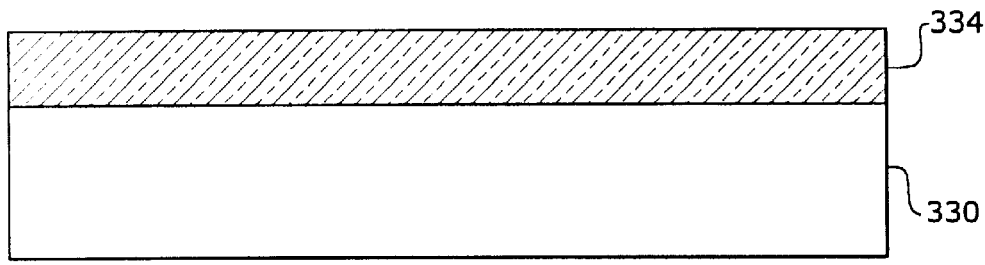
FIGS. 6, 6A, 6B and 6C are cross-sectional views of the accelerometer proof mass taken along line 3–6 to 3–6 of FIG. 1 during fabrication in accordance with an alternative technique.

Referring to FIG. 6, an alternative technique for processing a silicon substrate to provide the proof mass 14 will be described. A silicon substrate 330 is provided with a P+ type epitaxial layer 334 disposed thereover. The silicon substrate 330 has a thickness on the order of 500 microns and the epitaxial layer 334 has a thickness on the order of 10–15 microns. It will be appreciated however, that these thicknesses may be varied to accommodate the particular device being fabricated. Various conventional techniques may be used to provide the epitaxial layer 334 over the substrate 330. Preferably, the epitaxial layer 334 is substantially uniformly doped with boron to a concentration of greater than approximately $10^{20}$ to provide a sharp etch stop for subsequent process steps.

Figure 6A:
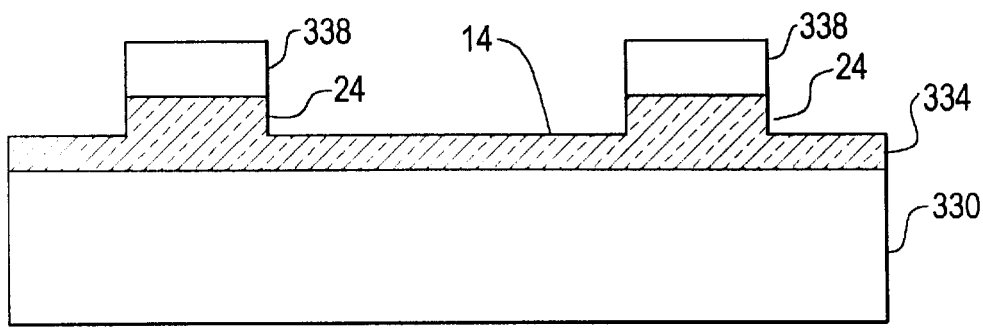

Referring also to FIG. 6A, the top surface of the epitaxial layer 334 is patterned with resist 338 in order to cover portions which will provide the anchor posts 24 (FIG. 1). Thereafter, the structure is etched by any conventional technique, such as reactive ion etching. The depth of the etching is selected in order to define a desired thickness for the resulting proof mass 14 and anchor posts 24.

Figure 6B:
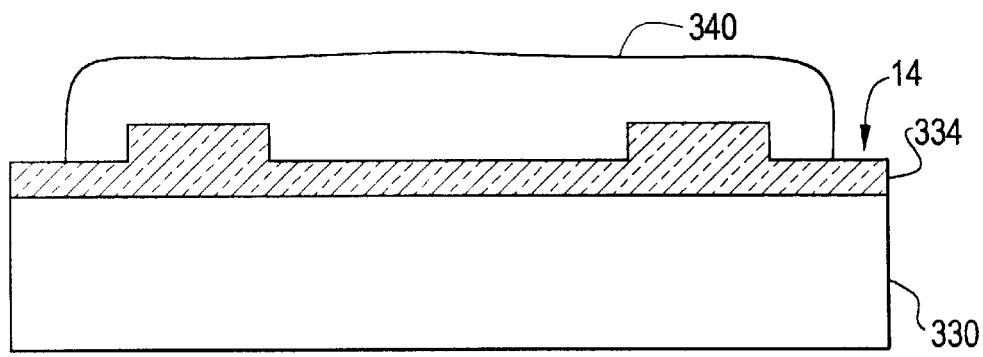

Referring to FIG. 6B, another layer of resist 340 is applied to the top surface of the epitaxial layer 334. The area covered by the resist 340 is selected to define the overall dimensions of the proof mass 14. The structure is thereafter etched to form the structure of FIG. 6C, in which the epitaxial layer 334 is terminated at locations in substantial vertical alignment with the ends of the resist 340.

Figure 6C:
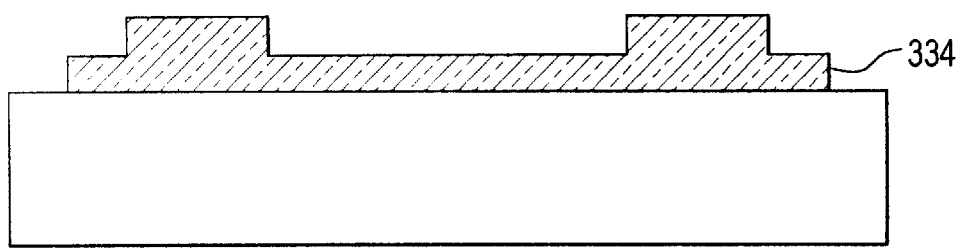

The resulting structure shown in FIG. 6C is then inverted and bonded to the glass substrate 310 (FIG. 4A) as described above in conjunction with FIG. 5. Thereafter, the silicon substrate 330 is removed, such as with the use of an EDP etchant, in order to provide the micromechanical accelerometer of FIG. 1.

Use of the alternative fabrication process described in conjunction with FIGS. 6–6C may be advantageous in certain applications in which the proof mass is susceptible to curling. Such susceptibility is more likely to occur in larger accelerometers, since the concentration of boron in the boron doped layer 306 (FIGS. 3A and 3B) is greater at the surface of the layer than deeper within the layer, thus causing a stress gradient to occur due to the mismatch of boron atoms within the silicon lattice. Since the extent of any such curling is proportional to the square of the length of the structure, proof mass curl may become a concern with larger sensors. Use of the epitaxial layer 334 eliminates any such stress gradient since the epitaxial layer is uniformly doped. Additionally, use of the epitaxial layer may reduce processing time since the epitaxial layer 334 can be deposited relatively quickly, for example on the order of approximately 0.1 microns per minute. Furthermore, the thickness of the proof mass 14 can be precisely set with the use of the epitaxial layer 334 since the thickness of the epitaxial layer 334 can be precisely measured once the etching step of FIG. 6A is performed. This is because of the very sharp doping gradient between the epitaxial layer 334 and the substrate 330.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

I claim:

1. A micromechanical sensor comprising:
   a proof mass suspended over a substrate by a plurality of flexures; and
   at least one stop mechanism disposed adjacent to a respective one of said plurality of flexures for preventing said flexure from deflecting more than a predetermined amount, said stop mechanism disposed such that said flexures communicate with said stop mechanism as a result of linear movement of said proof mass in a direction substantially perpendicular to said stop mechanism.

2. The micromechanical sensor recited in claim 1 wherein said at least one stop mechanism comprises a pair of elongated members, each one extending along a portion of a respective side of said flexure.

3. The micromechanical sensor recited in claim 2 wherein each of said elongated members has a rounded end.

4. The micromechanical sensor recited in claim 1 wherein each of said plurality of flexures has a first end attached to a support element suspended over said substrate by a post and a second end attached to said proof mass and wherein said at least one stop mechanism is cantilevered from said support element.

5. A micromechanical sensor comprising:
   a substrate oriented in a first plane;
   a plurality of posts, each extending substantially vertically from said substrate to terminate at a corresponding plurality of support elements;
   a plurality of flexures, each having a first end coupled to a corresponding one of said support elements and a second end;
   a proof mass suspended over said substrate by said flexures and having an input axis in a second plane coplanar to said first plane, wherein said second end of each of said plurality of flexures is attached to said proof mass; and
   a stop extending from one of said support elements along a portion of one of said plurality of flexures, said stop disposed such that said flexures communicate with said stop mechanism as a result of linear movement of said proof mass along said input axis.

6. The micromechanical sensor recited in claim 5 wherein said stop comprises a pair of elongated members, each one each extending along a portion of a respective side of said flexure.

7. The micromechanical sensor recited in claim 6 wherein each of said elongated members has a rounded end distal from said support element.

8. The micromechanical sensor recited in claim 5 wherein said sensor is an accelerometer.

9. The micromechanical sensor recited in claim 5 wherein said proof mass comprises a continuous frame.

10. The micromechanical sensor recited in claim 5 further comprising at least one excitation electrode support from which a plurality of excitation electrodes are cantilevered and a plurality of proof mass electrodes cantilevered from said proof mass, wherein said excitation electrodes are alternately interleaved with said proof mass electrodes.

11. The micromechanical sensor recited in claim 10 wherein said excitation electrodes selectively apply a rebalance force to said proof mass to restore said proof mass to a null position.

12. The micromechanical sensor recited in claim 5 further comprising:
   a second proof mass suspended over said substrate and having an input axis in said second plane and orthogonal with respect to said input axis of said first proof mass; and
   a third proof mass suspended over said substrate, said third proof mass having an input axis in a third plane orthogonal to said first and second planes, wherein said input axis of said third proof mass is mutually orthogonal with respect to said input axis of said first proof mass and said input axis of said second proof mass.

13. The micromechanical sensor recited in claim 9 wherein said frame comprises a pair of support beams in communication with said flexures and a plurality of crossbeams substantially perpendicular to and connecting said pair of support beams.

14. The micromechanical sensor recited in claim 5 further comprising at least one strain relief beam positioned at a junction of at least one of said plurality of flexures and said respective support element.

* * * * *